US009584411B2

United States Patent
Iyer et al.

(10) Patent No.: US 9,584,411 B2
(45) Date of Patent: Feb. 28, 2017

(54) POWER SAVE MECHANISM FOR LOW-POWER NETWORK DEVICES

(71) Applicant: QUALCOMM Incorporated, San Diego, CA (US)

(72) Inventors: Mahesh D. Iyer, Saratoga, CA (US); Amit Shukla, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 13/707,183

(22) Filed: Dec. 6, 2012

(65) Prior Publication Data

US 2014/0161118 A1 Jun. 12, 2014

(51) Int. Cl.
*H04L 12/28* (2006.01)
*H04L 12/721* (2013.01)
*H04W 52/02* (2009.01)

(52) U.S. Cl.
CPC ......... *H04L 45/70* (2013.01); *H04W 52/0216* (2013.01); *Y02B 60/50* (2013.01)

(58) Field of Classification Search
CPC . H04W 40/02; H04W 40/10; H04W 52/0261; H04W 52/04; H04W 52/38; H04W 84/12
See application file for complete search history.

(56) References Cited

U.S. PATENT DOCUMENTS

| 7,107,442 | B2 | 9/2006 | Cheshire |
| 7,231,530 | B1 * | 6/2007 | Miller ............... H04W 52/0225 709/230 |
| 7,587,462 | B2 * | 9/2009 | Zmudzinski et al. ........ 709/207 |
| 7,669,070 | B2 * | 2/2010 | Asmi et al. .................... 713/324 |
| 7,752,330 | B2 | 7/2010 | Olsen et al. |
| 8,380,203 | B1 * | 2/2013 | Semersky et al. ............ 455/437 |
| 8,660,548 | B1 * | 2/2014 | Lambert ....................... 455/418 |

(Continued)

FOREIGN PATENT DOCUMENTS

FR 2902916 12/2007
WO 9627993 9/1996

(Continued)

OTHER PUBLICATIONS

"US Application No. PCT/US/2013/072383 International Search Report and Written Opinion", Mar. 12, 2014, 9 pages.

(Continued)

*Primary Examiner* — Marsha D Banks Harold
*Assistant Examiner* — Elton Williams
(74) *Attorney, Agent, or Firm* — DeLizio Law, PLLC

(57) ABSTRACT

A power save unit of a first network device determines a sleep duration associated with a sleep mode of a low-power network device based on an exchange of information between the first network device and the low-power network device of a communication network. The power save unit determines whether the low-power network device is in the sleep mode. In response to determining that the low-power network device is in the sleep mode, the power save unit redirects network packets destined to the low-power network device to the first network device. The first network device stores the redirected network packets and notifies the low-power network device that the first network device has stored the redirected network packets.

38 Claims, 5 Drawing Sheets

(56) References Cited

U.S. PATENT DOCUMENTS

| | | | |
|---|---|---|---|
| 2003/0186703 A1* | 10/2003 | Cromer et al. | 455/450 |
| 2004/0128310 A1 | 7/2004 | Zmudzinski et al. | |
| 2006/0253735 A1* | 11/2006 | Kwak et al. | 714/12 |
| 2007/0211745 A1* | 9/2007 | Deshpande et al. | 370/432 |
| 2007/0264955 A1 | 11/2007 | Tsai et al. | |
| 2007/0297438 A1* | 12/2007 | Meylan et al. | 370/445 |
| 2009/0059814 A1* | 3/2009 | Nixon et al. | 370/254 |
| 2010/0149967 A1* | 6/2010 | Johansen | 370/225 |
| 2010/0218011 A1 | 8/2010 | Diab et al. | |
| 2010/0332212 A1* | 12/2010 | Finkelman | G06F 1/3203 703/23 |
| 2011/0038292 A1* | 2/2011 | Salomone et al. | 370/311 |
| 2011/0255444 A1* | 10/2011 | Soliman et al. | 370/255 |
| 2011/0299454 A1 | 12/2011 | Krishnaswamy | |
| 2012/0151028 A1* | 6/2012 | Lu et al. | 709/223 |
| 2012/0163177 A1* | 6/2012 | Vaswani et al. | 370/236 |
| 2013/0230035 A1* | 9/2013 | Grandhi et al. | 370/338 |
| 2013/0329627 A1* | 12/2013 | Liu | 370/315 |
| 2014/0098658 A1* | 4/2014 | Johansen | 370/221 |

FOREIGN PATENT DOCUMENTS

| | | |
|---|---|---|
| WO | 0010353 | 2/2000 |
| WO | 2014088911 | 6/2014 |

OTHER PUBLICATIONS

"PCT Application No. PCT/US2013/072383 Written Opinion", Nov. 26, 2014, 6 pages.

\* cited by examiner

POWER SAVE MECHANISM FOR LOW-POWER NETWORK DEVICES

BACKGROUND

Embodiments of the inventive subject matter generally relate to the field of communication networks, and, more particularly, to a power save mechanism for low-power network devices in a communication network.

Various communication networks include low-power network devices (e.g., sensors, door locks, etc.) that are typically battery powered. To conserve power, certain low-power network devices enter a sleep mode for a certain duration and periodically wake up to check any network activity (e.g., receive data, update address tables, send data, etc.). Increasing the sleep mode duration for the low-power devices can further improve power savings. In some cases, low-power devices can utilize Internet Protocol (IP) for data transfer. However, when a low-power device remains in the sleep mode for a prolonged period, the IP connection between the low-power device and an access point of the network may be lost, and re-establishing the IP connection can involve significant overhead.

SUMMARY

Various embodiments are disclosed of a power save mechanism for low-power network devices. In one embodiment, a communication link is established between a first network device and a low-power network device of a communication network. A sleep duration is determined associated with a sleep mode of the low-power network device based on an exchange of information between the first network device and the low-power network device. It is determined whether the low-power network device is in the sleep mode. In response to determining that the low-power network device is in the sleep mode, network packets destined to the low-power network device are redirected to the first network device. The network packets are stored at the first network device and the low-power device is notified that the first network device has stored the network packets.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
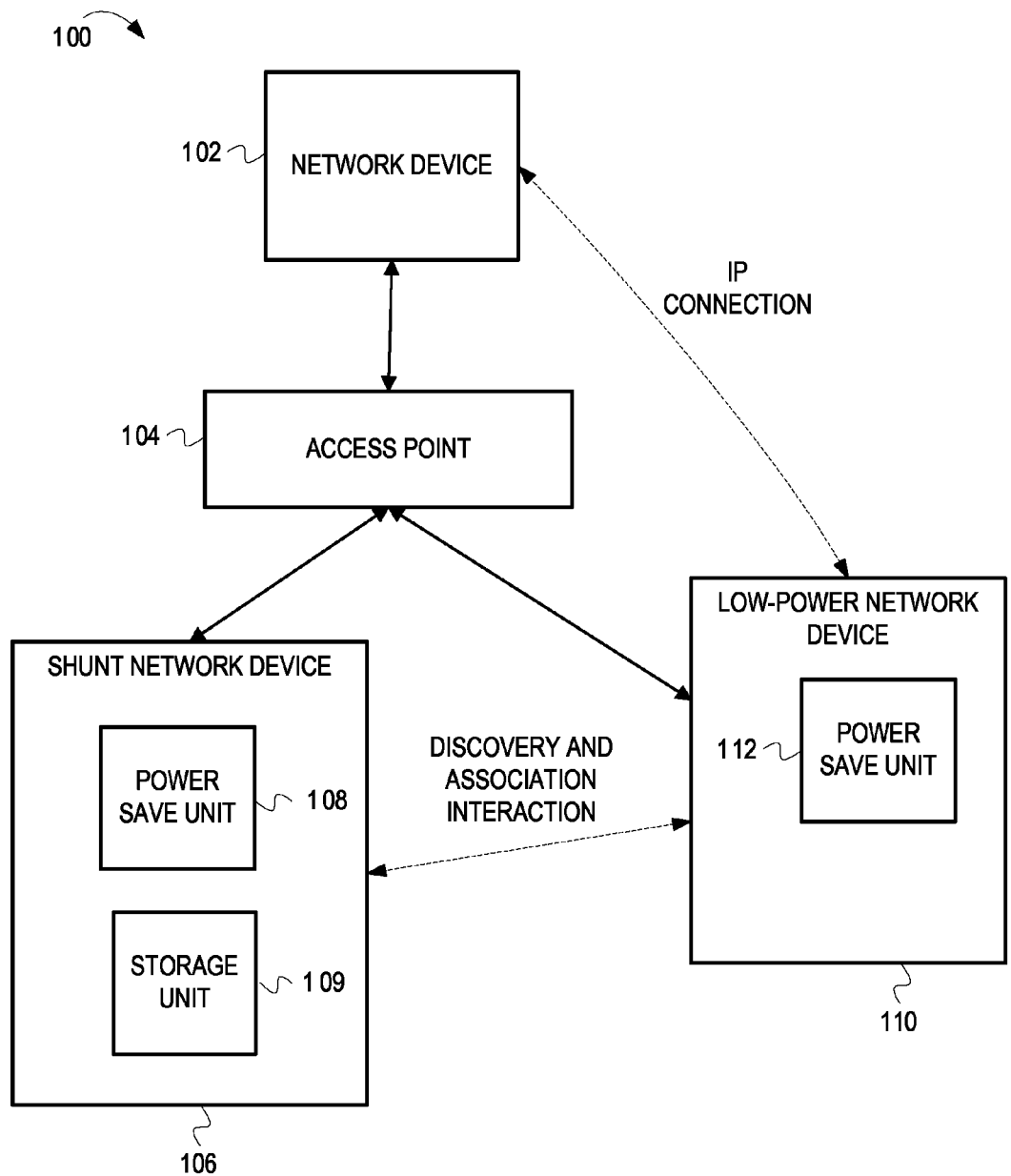
FIG. 1 depicts an example conceptual diagram of a communication network having network devices to implement a power save mechanism for low-power network devices.

The description that follows includes exemplary systems, methods, techniques, instruction sequences and computer program products that embody techniques of the present inventive subject matter. However, it is understood that the described embodiments may be practiced without these specific details. For instance, although examples refer to implementing a power save mechanism based on a sleep mode and an active mode of a low-power network device, embodiments are not so limited. In some embodiments, the power save mechanism may be implemented based on a semi-active mode of the low-power network device. In other instances, well-known instruction instances, protocols, structures and techniques have not been shown in detail in order not to obfuscate the description.

In some embodiments, a shunt network device that implements a power save mechanism along with low-power network devices can be used in a communication network for power savings at the low-power network devices. The power save mechanism allows a low-power network device to remain in a sleep mode for a longer duration by redirecting the network packets destined to the low-power network device to the shunt network device. Also, the power save mechanism allows the low-power network device to maintain its internet protocol (IP) connection with an access point of the communication network while the low-power network device is in the sleep mode. The low-power network device and the shunt network device can agree on a predetermined sleep duration (or a sleep schedule) for which the low-power network device remains in the sleep mode, and the shunt network device stores the network packets destined to the low-power network device. On completion of the sleep duration, the low-power network device receives data buffered by the shunt network device.

In some embodiments, the shunt network device and the low-power network device exchange discovery messages to discover each other. The low-power network device and the shunt network device also exchange power save information and device capabilities. For example, the power save information indicates that the low-power network device is a battery powered device, and the shunt network device is a network device plugged into an uninterrupted power source. In one implementation, the device capabilities of the shunt network device indicate to the low-power network device the storage capacity of the shunt network device to store buffered data. Based on the exchange of power save information and device capabilities, the shunt network device and the low-power network device can negotiate a sleep duration for the low-power network device. In some implementations, the shunt network device may redirect the network packets destined to the low-power network device by using gratuitous address resolution protocol (ARP). On completion of the sleep duration, the low-power network device can direct the network packets to itself (e.g., invalidate the redirection set by the shunt network device in the ARP table), and receive the data buffered by the shunt network device.

FIG. 1 depicts an example conceptual diagram of a communication network having network devices to implement a power save mechanism for low-power network devices. FIG. 1 includes a communication network 100 (e.g., Bluetooth®, WLAN, etc.). The communication network 100 includes a network device 102 (e.g., a server, notebook computer, etc.), an access point 104, a shunt network device 106 having a power save unit 108 and a storage unit 109, and a low-power network device 110 having a power save unit 112. The access point 104 may be a wireless access point that facilitates network connectivity to the shunt network device 106 and the low-power network device 110 (and also other devices) in the communication network 100. In some implementations the access point 104 may be a hybrid gateway or a hybrid router. The shunt network device 106 is typically a network device (e.g., a computer, a laptop, etc.) connected to an uninterrupted power source (e.g., a power outlet). The low-power network device 110 is typically a battery powered device (e.g., an electronic door lock, a motion sensor, a light sensor, etc.) in the communication network 100. The network device 102 may be a local network device or a remote network device. The storage unit 109 in the shunt network device 106 may include a memory and/or disk storage that can be used to store buffered data destined to the low-power network device 110. The power save unit 108 and the power save unit 112 may include one or more hardware and/or software components to implement the power save mechanism for the low-power network device 110. The power save units 108 and 112 may include executable program instructions to facilitate interaction between the shunt network device 106 and the low-power network device 110 for several purposes including exchanging discovery messages, negotiating a sleep duration for the low-power network device, retrieving buffered data at the shunt network device 106, etc. For simplification, FIG. 1 does not depict all components of the network device 102, the access point 104, the shunt network device 106, and the low-power network device 110.

In some embodiments, the shunt network device 106, the low-power network device 110 and the network device 102 establish an IP connection with the access point 104. The low-power network device 110 may interact with the network device 102 over the IP connection for various purposes. For example, the low-power network device 110 is an electronic door lock which validates a password or an identifier by interacting with the network device 102 to selectively allow access. The shunt network device 106 and the low-power network device 110 exchange messages to discover each other (e.g., using action frames, probes, etc.), and determine each other's power save mode. For example, the shunt network device 106 determines that the low-power network device 110 is a battery powered device, and the low-power network device 110 determines that the shunt network device 106 is connected to an uninterrupted power source. In some embodiments, the low-power network device 110 may also indicate that it is searching for a shunt network device (i.e., a network device capable of redirecting and storing network packets). Also, the shunt network device 106 can broadcast its availability to act as a shunt network device.

The low-power network device 110 then determines the capabilities of the shunt network device 106 (e.g., storage capacity of the storage unit 109, etc.). Based on the capabilities of the shunt network device 106, the low-power network device 110 and the shunt network device 106 negotiate the sleep duration for which the low-power network device 110 can remain in a sleep mode. In some embodiments, the shunt network device 106 and the low-power network device 110 can negotiate on a sleep schedule (e.g., a series of successive sleep durations) for the low-power network device 110.

Based on the sleep duration or the sleep schedule, the shunt network device 106 redirects network packets destined to the low-power network device 110 to itself. For example, the shunt network device 106 modifies one or more entries in an ARP table in the access point 104 to redirect the network packets to the shunt network device 106. The shunt network device 106 can store the redirected network packets in the storage unit 109. On receiving the network packets destined to the low-power network device 110, the shunt network device 106 can set an indicator to inform the low-power network device 110 that the shunt network device 106 has buffered the data packets. For example, the shunt network device 106 can send a NULL frame to set a traffic indication map (TIM) to inform the low-power network device 110 about the data buffered at the shunt network device 106. For example, the shunt network device 106 can send the NULL frame to set the delivery traffic indication message (DTIM) bit in the TIM.

On completion of the sleep duration, the low-power network device 110 can enter an active mode and invalidate the redirection of network packets to the shunt network device 106 (originally destined to the low-power network device 110). For example, the low-power network device 110 can modify the one or more in the ARP table at the access point 104 to cancel the redirection. The low-power network device 110 also determines whether buffered data is present at the shunt network device 106 based on the TIM. When buffered data is present, the low-power network device 110 can request the shunt network device 106 for the buffered data. It is noted that in some implementations, the shunt network device 106 can also invalidate the redirection of network packets to itself.

Although FIG. 1 depicts the shunt network device 106 facilitating the power save mechanism for a single low-power network device (i.e., the low-power network device 110), embodiments are not so limited. In some embodiments, the shunt network device 106 may facilitate the power save mechanism for multiple low-power network devices. In some implementations, the shunt network device 106 may utilize multiple power save units and/or multiple storage units to facilitate the power save mechanism for multiple low-power network devices. Also, in some embodiments, the communication network 100 may include multiple shunt network devices, and the low-power network device 110 may determine which shunt network device to utilize for the power save mechanism based on the capabilities of the available shunt network devices. For example, the communication network 100 may include devices which can act as a shunt network device for the low-power network device 110. The low-power network device 110 may determine to utilize one of the shunt network devices based on one or more capabilities of the shunt network device. For example, the low-power network device 110 may determine to utilize the shunt network device for the power save mechanism based on the storage capacity of the shunt network device.

Figure 2:
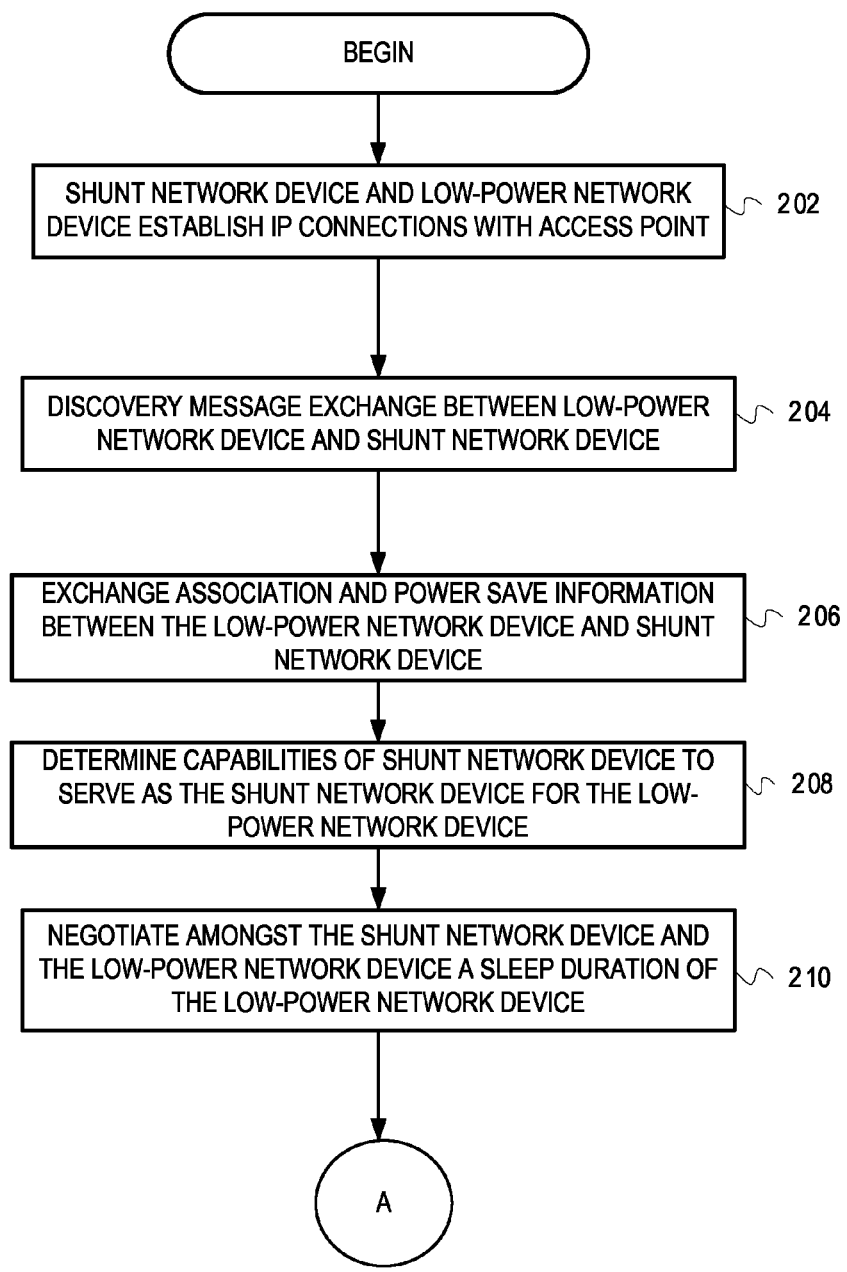
FIG. 2 illustrates a flow diagram of example operations for an association between a low-power network device and a shunt network device.

FIG. 2 illustrates a flow diagram ("flow") of example operations for an association between a low-power network device and a shunt network device. The flow begins at block 202.

At block 202, a shunt network device and a low-power network device establish IP connections with an access point. In one implementation, the shunt network device 106 and the low-power network device 110 establish IP connections with the access point 104, as described above with reference to FIG. 1. The shunt network device 106 may utilize a network configuration unit (not shown) to establish the IP connection. Similarly, the low-power network device 110 may utilize a network configuration unit to establish the IP connection.

At block 204, discovery messages are exchanged between the low-power network device and the shunt network device. In one implementation, the power save unit 112 in the low-power network device 110 exchanges discovery messages with the power save unit 108 in the shunt network device 106. For example, power save units 112 and 108 exchange discovery messages using probes, public action frames, etc. to learn about the network devices in the communication network 100. In some implementations, the low-power network device 110 and the shunt network device 106 can advertise their presence to each other using the probes or public action frames. The flow continues at block 206.

At block 206, association and power save information is exchanged between the low-power network device and the shunt network device. In one implementation, the power save unit 112 in the low-power network device 110 and the power save unit 108 in the shunt network device 106 exchange IP addresses, socket numbers for the IP connections, etc. For example, the power save unit 112 and the power save unit 108 exchange IP addresses and socket numbers for the IP connection between the low-power network device 110 and the shunt network device 106. The power save units 112 and 108 also exchange information about the power source (e.g., uninterrupted power source, battery, etc.) of the respective network device. For example, the power save unit 112 receives information from the power save unit 108 that the shunt network device 106 is connected to an uninterrupted power source. Also, the power save unit 108 receives information from the power save unit 112 that the low-power network device 110 is powered by a battery. The flow continues at block 208.

At block 208, capabilities of the shunt network device to serve as a shunt network device for the low-power network device are determined. In one implementation, the power save unit 112 in the low-power network device 110 determines the available storage capacity of the storage unit 109 in the shunt network device 106 to store buffered data. The flow continues at block 210.

Figure 3:
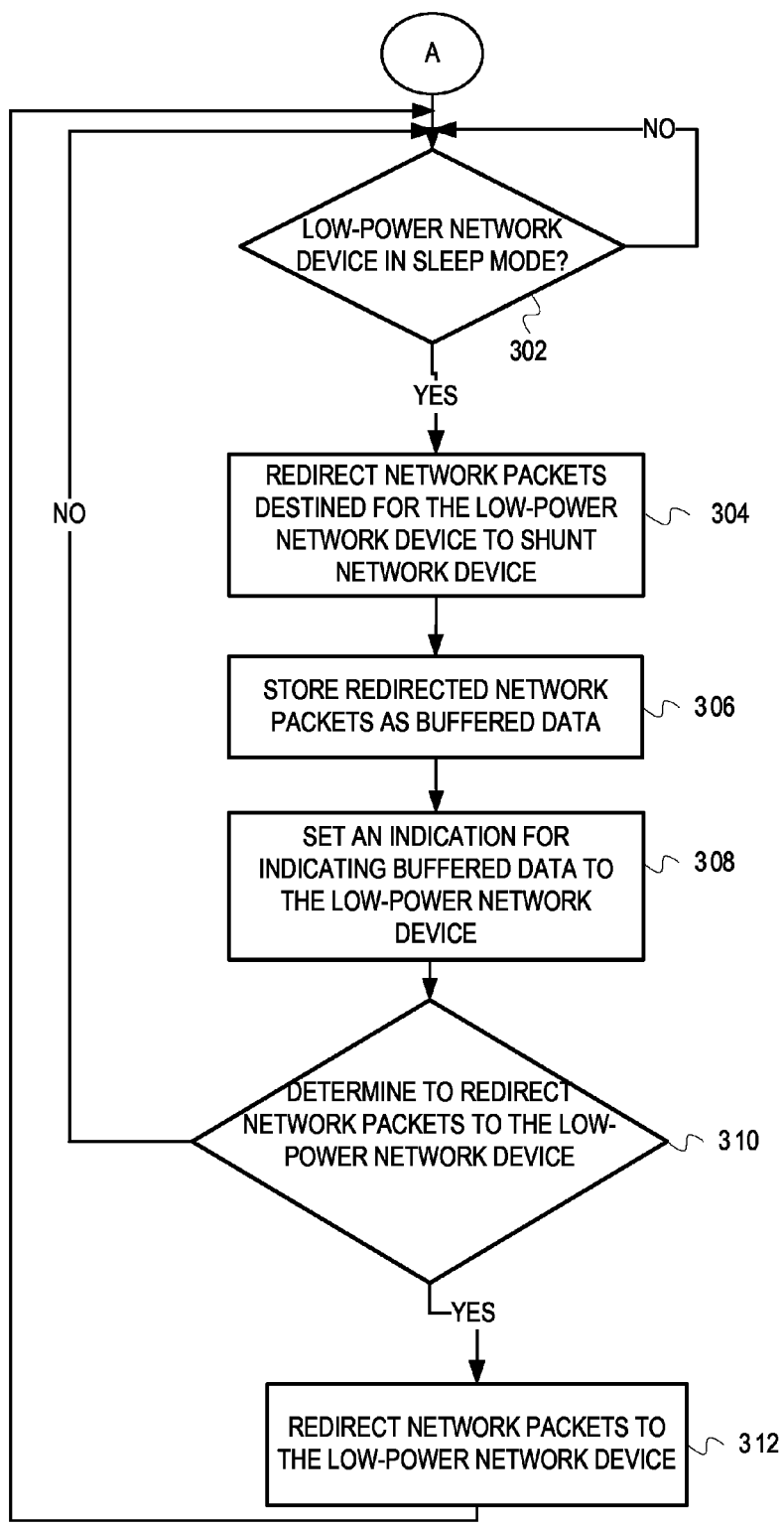
FIG. 3 illustrates a flow diagram of example operations of a shunt network device to implement the power save mechanism.
Figure 4:
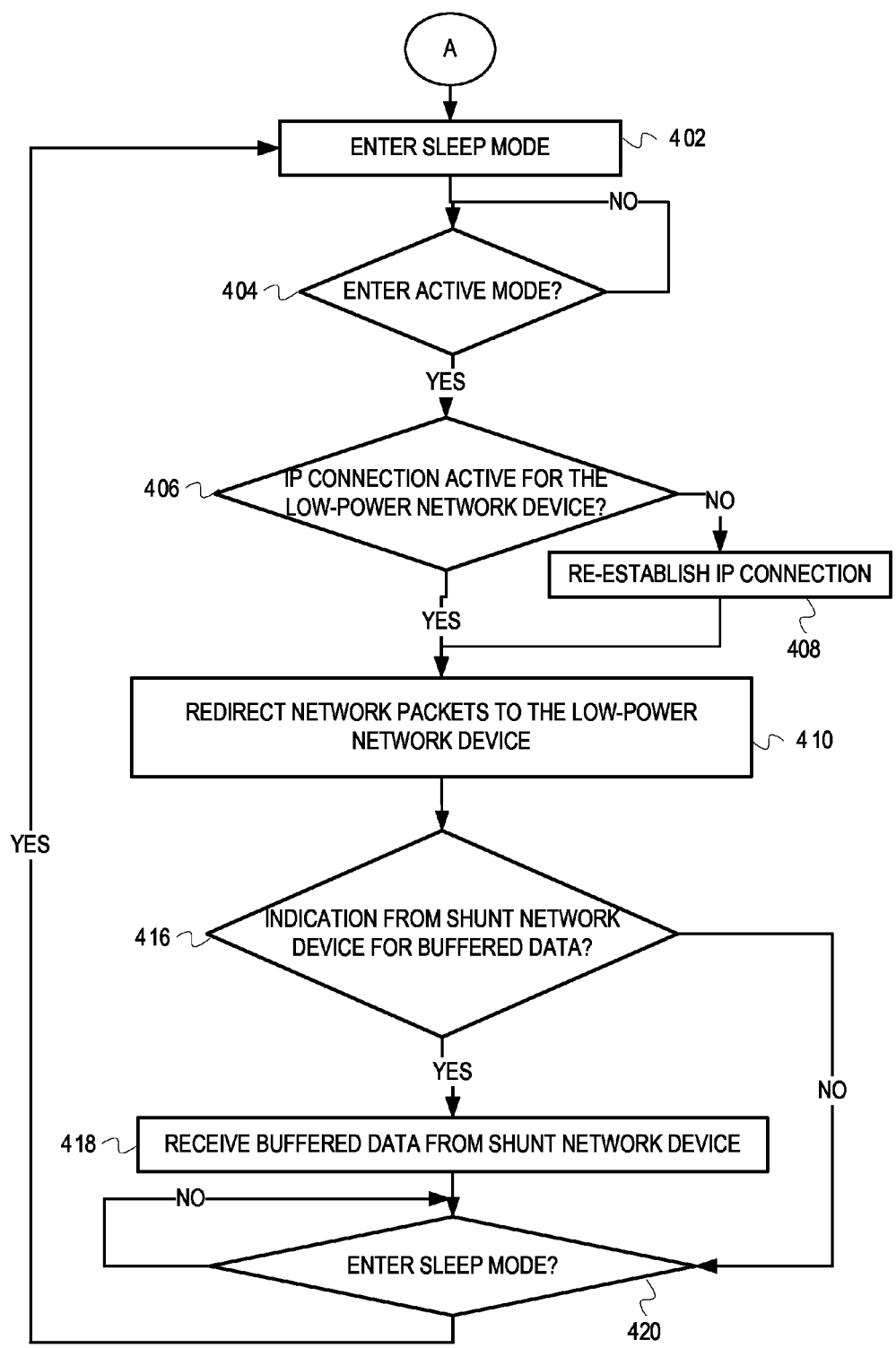
FIG. 4 illustrates a flow diagram of example operations of a low-power network device to implement the power save mechanism.

At block 210, the shunt network device and the low-power network device negotiate a sleep duration for the low-power network device. In one implementation, the power save units 108 and 112 negotiate the sleep duration for the low-power network device 110. For example, the power save units 108 and 112 negotiate the sleep duration based on the power save requirements of the low-power network device 110 and the available storage capacity in the storage unit 109 to store buffered data. In some embodiments, the power save units 108 and 112 can negotiate a sleep schedule for the low-power network device 110. For example, the sleep schedule implements repeating time intervals for which the low-power network device 110 is in the sleep mode for the sleep duration. It is noted, however, that in other embodiments the repeating time intervals associated with the sleep schedule may include one or more different sleep durations or varying sleep durations. The flow continues to stage A, which represents the starting point for the flow diagrams in FIG. 3 and FIG. 4 as described below. FIG. 3 illustrates operations performed by the shunt network device 106 and FIG. 4 illustrates operations performed by the low-power network device 110.

FIG. 3 illustrates a flow diagram ("flow") of example operations of a shunt network device to implement the power save mechanism. The flow resumes at block 302 from stage A, as described above with reference to FIG. 2.

At block 302, it is determined whether the low-power network device is in a sleep mode. In one implementation, the power save unit 108 in the shunt network device 106 determines whether the low-power network device 110 is in the sleep mode. For example, the power save unit 108 determines that the low-power network device 110 is in the sleep mode when a power management (PM) bit is set. If the low-power network device 110 is in the sleep mode, the flow continues to block 304. If the low-power network device 110 is not in the sleep mode, the flow loops back to block 302.

At block 304, network packets destined for the low-power network device are redirected to the shunt network device. In one implementation, the power save unit 108 redirects the network packets using gratuitous ARP to the shunt network device 106. For example, the power save unit 108 modifies one or more entries in an ARP table at the access point 104 to redirect network packets to the shunt network device 106. The flow continues at block 306.

At block 306, the redirected network packets are stored as buffered data. In one implementation, the power save unit 108 may store the redirected network packets (received at the shunt network device 106) in the storage unit 109. The power save unit 108 may store the redirected network packets as received, or may modify the format of network packets before they are stored in the storage unit 109. The flow continues at block 308.

At block 308, an indication is set for indicating buffered data to the low-power network device. In one implementation, the power save unit 108 sets an indication to inform the low-power network device 110 when the shunt network device 106 has stored redirected network packets. For example, the power save unit 108 sends a NULL frame to set DTIM bit in the TIM to indicate the low-power network device 110 about the network packets buffered at the shunt network device 106. It is noted, however, that in other implementations the power save unit 108 may notify the low-power network device 110 of the buffered data by other techniques. The flow continues at block 310.

At block 310, it is determined whether to redirect network packets to the low-power network device. In one implementation, the power save unit 108 determines whether to redirect the network packets (i.e., the network packets originally destined to the low-power network device 110) to the low-power network device 110 based on whether the low-power network device 110 is in an active mode. For example, when the low-power network device 110 is in the active mode, the power save unit 108 determines to redirect the network packets to the low-power network device 110. When the low-power network device is in the sleep mode, the power save unit 108 determines not to redirect the network packets to the low-power network device. If the power save unit 108 determines to redirect the network packets to the low-power network device 110, the flow continues to block 312. If the power save unit 108 determines not to redirect the network packets to the low-power network device 110, control loops back to block 302.

At block 312, the network packets are redirected to the low-power network device. In one implementation, the power save unit 108 redirects the network packets to the low-power network device 110 using gratuitous ARP. For example, the power save unit 108 modifies the one or more entries in the ARP table in the access point 104 to invalidate the redirection of network packets (at block 304), to redirect the network packets back to the low-power network device 110. In some embodiments, when the power save unit 112 redirects the network packets to the low-power network device 110 (as described below at block 410 with reference to FIG. 4), the power save unit 108 does not redirect the network packets to the low-power network device 110. The control then loops back to block 302.

FIG. 4 illustrates a flow diagram ("flow") of example operations of a low-power network device to implement the power save mechanism. The flow resumes at block 402 from stage A, as described above with reference to FIG. 2.

At block 402, the low-power network device enters a sleep mode. For example, the low-power network device 110 enters the sleep mode according to the negotiated sleep schedule between the shunt network device 106 and the low-power network device 110 (e.g., described above at block 210 of FIG. 2). In one implementation, the power save unit 112 of the low-power network device 110 turns off one or more components in the low-power network device 110 to enter the sleep mode. In one example, the power save unit 112 turns off or reduces the power provided by a power supply of the low-power network device 110 to cause the device to enter the sleep mode. The power save unit 112 sets the PM bit on entering the sleep mode. It is noted that in the power save mechanism, the power save unit 112 maintains the IP connection of the low-power network device 110 with one or more network devices (e.g., the network device 102). The power save unit 112 can disable the media access control (MAC) layer connection for the low-power network device 110 during the sleep mode. The flow continues at block 404.

At block 404, the low-power network device determines to enter an active mode. In one implementation, the power save unit 112 in the low-power network device 110 determines to enter the active mode based on the expiration of the negotiated sleep duration (i.e., the sleep duration negotiated at block 210, as described above with reference to FIG. 2). In some implementations, the power save unit 112 may determine to enter the active mode based on a sleep schedule. If the power save unit 112 determines to enter the active mode, the flow continues to block 406. If the power save unit 112 determines not to enter the active mode, control loops back to block 404.

At block 406, it is determined whether an IP connection is active for the low-power network device. In one implementation, the power save unit 112 determines whether the IP connection of the low-power network device 110 with the access point 104 is active. Although the power save mechanism may initially maintain the IP connection of the low-power network device 110, the IP connection may be lost in certain scenarios (e.g., the access point 104 being out-of-range, etc.). The operations at block 406 and 408 (as described below) ensure that the IP connection of the low-power network device 110 is maintained. If the IP connection of the low-power network device 110 with the access point 104 is active, the flow continues to block 410. If the IP connection of the low-power network device 110 with the access point 104 is not active, the flow continues to block 408.

At block 408, the IP connection of the low-power network device 110 is re-established. In one implementation, the power save unit 112 interacts with one or more units in the low-power network device 110 to re-establish the IP connection with the access point 104. The flow continues to block 410.

At block 410, network packets are redirected to the low-power network device. In one implementation, the power save unit 112 redirects the network packets (i.e., the network packets redirected by the power save unit 108 at block 304, as described above with reference to FIG. 3) to the low-power network device 110 using gratuitous ARP. For example, the power save unit 112 modifies one or more entries in the ARP table at the access point 104 to invalidate the redirection of the network packets to the shunt network device 106. In some embodiments, when the power save unit 108 redirects the network packets to the low-power network device 110 (as described at block 312 in FIG. 3), the power save unit 112 does not redirect the network packets to the low-power network device 110. The flow continues at block 416.

At block 416, it is determined whether there is an indication from the shunt network device for buffered data. In one implementation, the power save unit 112 determines whether there is an indication from the shunt network device 106 for buffered data. For example, the power save unit 112 determines whether a TIM indicates buffered data (e.g., the DTIM bit in the TIM is set). If the power save unit 112 determines that the TIM indicates buffered data, flow continues to block 418. If the power save unit 112 determines that the TIM does not indicate buffered data, flow continues to block 420.

At block 418, the buffered data from the shunt network device is received. In one implementation, the power save unit 112 interacts with one or more units (e.g., the power save unit 108 and the storage unit 109), in the shunt network device 106 to receive the buffered data from the shunt network device 106. In some embodiments, when a sleep duration/schedule does not permit the low-power network device 110 to stay in the active mode and receive all the data buffered at the shunt network device 106, the power save unit 112 may extend the period for which the low-power network device 110 remains in the active mode. For example, the low-power network device 110 may be scheduled to enter the sleep mode for a pre-defined duration based on a sleep schedule for the low-power network device 110. However, when the low-power network device 110 is not able to receive all the buffered data from the shunt network device 106, the low-power network device 110 may not enter the sleep mode. The power save unit 112 may extend the duration of active mode for the low-power network device 110 until all the buffered data is received from the shunt network device 106. In other embodiments, the power save unit 112 may indicate to one or more units in the shunt network device 106 that the low-power network device 110 will receive the remaining buffered data in the next active mode period. For example, the low-power network device 110 may be scheduled to enter the sleep mode for a pre-defined duration based on a sleep schedule. However, when the low-power network device 110 is not able to receive all the buffered data from the shunt network device 106, the low-power network device may send an indication to the shunt network device 106 before entering the sleep mode. The power save unit 112 can send an indication to the power save unit 108 or the storage unit 109 in the shunt network device 106 to save part of the buffered data and send it in the next active mode period. The flow continues at block 420.

At block 420, it is determined for the low-power network device whether to enter the sleep mode. In one implementation, the power save unit 112 in the low-power network device 110 determines whether to enter the sleep mode. For example, the power save unit 112 determines to enter the sleep mode based on the negotiated sleep schedule (as described above at block 210, with reference to FIG. 2). The power save unit 112 may also determine to enter the sleep mode when the low-power network device 110 is not communicating with one or more network devices in the communication network 100. If the power save unit 112 determines to enter the sleep mode, flow loops back to block 402, where the low-power network device 110 enters the sleep mode. If the power save unit 112 determines not to enter the sleep mode, flow loops back to block 420.

The concept diagram and flow diagrams depicted in FIGS. 1-4 are examples meant to aid in understanding embodiments. Embodiments may comprise additional system components, different system components, and/or may perform additional operations, fewer operations, operations in a different order, operations in parallel, and some operations differently. For example, the negotiation of the sleep duration/schedule is not limited to occur at the block 210, but the power save units 108 and 112 may dynamically negotiate the sleep duration/schedule when the low-power network device 110 is already observing a sleep duration/schedule.

The shunt network device 106, in the power save mechanism described above with reference to FIGS. 1-4, may not have the capability to determine the contents of the buffered network packets. For example, the power save mechanism may be implemented over the MAC layer and the shunt network device 106 may not be able to determine the contents of the buffered network packets. In some embodiments, when the storage unit 109 does not have capacity to buffer all the redirected network packets, the power save unit 108 may not receive the redirected network packets (i.e., decline to receive the redirected network packets). Additionally, the power save unit 108 may request another shunt network device in the communication network 100 to store the redirected network packets. In some implementations, the power save unit 108 may utilize gratuitous ARP to redirect the network packets to the low-power network device 110.

It is also noted that the power save mechanism, as described above with reference to FIGS. 1-4, may be implemented over existing network standards (e.g., 802.11 WLAN, Bluetooth, etc.) as well as new systems or standards. In some implementations, the power save mechanism may be implemented at the data link layer.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
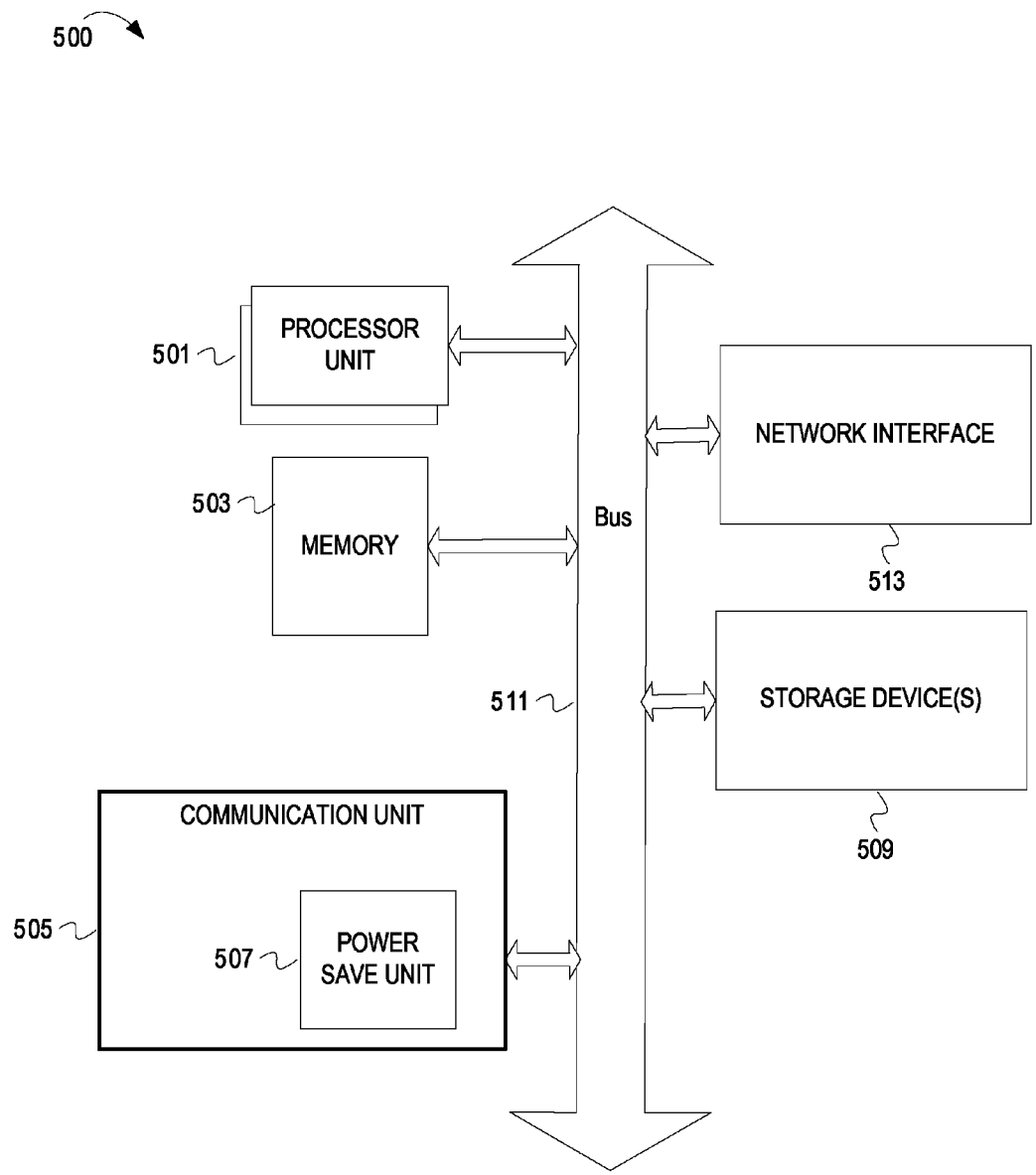
FIG. 5 depicts an example network device.

FIG. 5 depicts an example network device 500. In some implementations, the network device 500 may be a server, a computer, a laptop, an electronic door lock, motion sensor, smart appliance, etc., as will be further described below. The network device 500 includes a processor unit 501 (possibly including multiple processors, multiple cores, multiple nodes, and/or implementing multi-threading, etc.). The network device 500 includes memory 503. The memory 503 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or one or more of the above already described possible realizations of machine-readable media. The network device 500 also includes a bus 511 (e.g., PCI, PCI-Express, AHB™ AXI™ NoC, etc.), a communication unit 505, a network interface 513, and a storage device(s) 509 (e.g., optical storage, magnetic storage, network attached storage, etc.). The network interface 513 may be a wireless network interface (e.g., a WLAN interface, a wireless sensor network interface, etc.). In some embodiments, the network interface 513 may be embodied in the communication unit 505. The communication unit 505 may include one or more hardware and software components to allow communication between the network device 500 and one or more network devices. The communication unit 505 may be partially (or entirely) implemented in one or more integrated circuits (e.g., one or more application specific integrated circuits). The communication unit 505 also includes a power save unit 507. The power save unit 507 includes one or more components to facilitate the interaction of the network device 500 with one or more network devices to implement the power save mechanism as described above with reference to FIGS. 1-4. For example, the network device 500 may be configured as a shunt network device (e.g., a server) or as a low-power network device (e.g., a motion sensor, an electronic door lock, etc.). It is noted that, when the network device 500 is configured as a low-power network device, the network device 500 may not include components which are included when the network device 500 is configured as a shunt network device due to cost and/or size constraints. For example, when the network device 500 is configured as the low-power network device, the network device 500 may not include the storage device (s) 509 and the memory 503 may be limited in size. One or more of these functionalities may be partially (or entirely) implemented in hardware or an application specific integrated circuit. Further, realizations may include fewer or additional components not illustrated in FIG. 5 (e.g., video cards, audio cards, additional network interfaces, peripheral devices, etc.). The processor unit 501, the storage device(s) 509, and the communication unit 505 are coupled to the bus 511. Although illustrated as being coupled to the bus 511, the memory 503 may be coupled to the processor unit 501.

While the embodiments are described with reference to various implementations and exploitations, it will be understood that these embodiments are illustrative and that the scope of the inventive subject matter is not limited to them. In general, techniques for implementing a power save mechanism for low-power network devices in a communication network as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a first network device, the method comprising:
   transmitting, from the first network device to a low-power network device via an access point of a communication network, a first message indicating that the first network device supports a power save mechanism for the low-power network device communicatively coupled to the access point;
   receiving, from the low-power network device, a second message associated with requesting the power save mechanism; and
   in response to receiving the second message associated with requesting the power save mechanism:
      determining a sleep duration associated with a sleep mode of the low-power network device;
      causing packets destined for the low-power network device to be redirected to the first network device by the access point for at least part of the sleep duration;
      buffering the packets at the first network device while the low-power network device is in the sleep mode;
      sending a traffic indication map (TIM) message from the first network device to the low-power network device, wherein the TIM message includes a delivery traffic indication message (DTIM) bit to indicate the packets have been buffered; and
      providing the packets, which have been buffered at the first network device during the sleep duration, from the first network device to the low-power network device via the access point.

2. The method of claim 1, further comprising receiving power save information from the low-power network device, wherein the sleep duration is determined based, at least in part, on the power save information.

3. The method of claim 1, further comprising determining a network address of the low-power network device, wherein providing the packets comprises providing the packets to the network address of the low-power network device.

4. The method of claim 1, further comprising determining to implement the power save mechanism in response to determining that the low-power network device is a battery powered device.

5. The method of claim 1, wherein determining the sleep duration comprises determining a sleep schedule that indicates repeating time intervals for which the low-power network device is in the sleep mode for the sleep duration.

6. The method of claim 1, wherein determining the sleep duration comprises:
   sending available storage capacity information regarding the first network device to the low-power network device;
   receiving a power save requirement from the low-power network device; and
   determining the sleep duration based, at least in part, on the available storage capacity information and the power save requirement.

7. The method of claim 1, wherein determining the sleep duration comprises negotiating the sleep duration with the low-power network device.

8. The method of claim 1, wherein the low-power network device is a battery powered device and the first network device is connected to an uninterrupted power source.

9. The method of claim 1, wherein providing the packets comprises:
determining, at the first network device, that the low-power network device is in an active mode; and
sending the packets from the first network device to the low-power network device in response to determining that the low-power network device is in the active mode.

10. The method of claim 1, further comprising:
determining, at the first network device, whether the low-power network device is in the sleep mode based, at least in part, on whether a power management bit sent by the low-power network device is set.

11. The method of claim 1, wherein causing the packets to be redirected comprises sending a first gratuitous address resolution protocol (ARP) message to the access point to redirect the packets to the first network device.

12. The method of claim 1, further comprising:
sending a notification to the low-power network device that the first network device has buffered the packets for the low-power network device.

13. The method of claim 11, further comprising, after causing the packets to be redirected, sending a second gratuitous ARP message via to the access point to direct subsequent packets to the low-power network device in response to a determination that the low-power network device is not in the sleep mode.

14. A method performed by a low-power network device, the method comprising:
receiving, from a first network device, a first message via an access point of a communication network, the first message indicating that the first network device supports a power save mechanism for the low-power network device communicatively coupled to the access point;
transmitting, from the low-power network device, a second message associated with requesting the power save mechanism; and
in response to transmitting the second message associated with requesting the power save mechanism:
determining a sleep duration associated with a sleep mode of the low-power network device;
disabling a network connection with the access point during the sleep duration associated with the sleep mode; and
after the sleep duration associated with the sleep mode:
enabling the network connection with the access point,
receiving a traffic indication map (TIM) message from the first network device, wherein the TIM message includes a delivery traffic indication message (DTIM) bit to indicate that the first network device has buffered packets destined for the low-power network device that were redirected by the access point to the first network device in accordance with the power save mechanism, and
receiving the packets from the first network device.

15. The method of claim 14, further comprising transmitting power save information to the first network device, wherein the sleep duration is determined based, at least in part, on the power save information.

16. The method of claim 14, wherein determining the sleep duration comprises determining a sleep schedule that indicates repeating time intervals for which the low-power network device is in the sleep mode for the sleep duration.

17. The method of claim 16, wherein disabling the network connection corresponds to entering the sleep mode based, at least in part, on the sleep schedule.

18. The method of claim 14, wherein determining the sleep duration comprises:
sending a power save requirement from the low-power network device to the first network device;
receiving available storage capacity information from the first network device; and
determining the sleep duration based, at least in part, on the available storage capacity information and the power save requirement.

19. The method of claim 14, wherein the low-power network device is a battery powered device and the first network device is connected to an uninterrupted power source.

20. The method of claim 14, further comprising sending an indication to the first network device via the access point before entering the sleep mode.

21. The method of claim 14, further comprising:
determining whether an internet protocol (IP) connection to the access point is active in response to enabling the network connection; and
re-establishing the IP connection to the access point in response to a determination that the IP connection to the access point is not active.

22. The method of claim 14, further comprising:
sending a gratuitous address resolution protocol (ARP) message to the access point to direct subsequent packets to the low-power network device in response to a determination that the low-power network device is not in the sleep mode.

23. The method of claim 14, further comprising:
determining, based, at least in part, on a notification from the first network device, that the first network device has buffered the packets destined for the low-power network device.

24. A first network device comprising:
a network interface;
a processor; and
memory having instructions stored therein which, when executed by the processor, cause the first network device to:
transmit, from the first network device to a low-power network device via an access point of a communication network, a first message indicating that the first network device supports a power save mechanism for the low-power network device communicatively coupled to the access point;
receive, from the low-power network device, a second message associated with requesting the power save mechanism; and in response to receiving the second message associated with requesting the power save mechanism:
determine a sleep duration for a sleep mode of the low-power network device;
cause packets destined for the low-power network device to be redirected to the first network device by the access point for at least part of the sleep duration;
buffer the packets at the first network device while the low-power network device is in the sleep mode;

send a traffic indication map (TIM) message from the first network device to the low-power network device, wherein the TIM message includes a delivery traffic indication message (DTIM) bit to indicate the packets have been buffered; and provide the packets, which have been buffered at the first network device during the sleep duration, from the first network device to the low-power network device via the access point.

25. The first network device of claim 24, wherein the instructions, when executed by the processor, cause the first network device to determine a sleep schedule associated with the low-power network device, wherein the sleep schedule indicates repeating time intervals for which the low-power network device is in the sleep mode for the sleep duration.

26. The first network device of claim 24, wherein the instructions, when executed by the processor, cause the first network device to:
send available storage capacity information to the low-power network device;
receive a power save requirement from the low-power network device; and
determine the sleep duration based, at least in part, on the available storage capacity information and the power save requirement.

27. The first network device of claim 24, wherein the instructions, when executed by the processor, cause the first network device to:
determine that the low-power network device is in an active mode; and
send the packets to the low-power network device in response to a determination that the low-power network device is in the active mode.

28. The first network device of claim 24, wherein the instructions to cause the packets to be redirected comprises instructions which, when executed by the processor, cause the first network device to send a gratuitous address resolution protocol (ARP) message to the access point to redirect the packets to the first network device.

29. The first network device of claim 24, wherein the instructions, when executed by the processor, cause the first network device to send a traffic indication map to indicate to the low-power network device that the first network device has buffered the packets.

30. A low-power network device comprising:
a network interface;
a processor; and
memory having instructions stored therein which, when executed by the processor, cause the low-power network device to:
receive, from a first network device, a first message via an access point of a communication network, the first message indicating that the first network device supports a power save mechanism for the low-power network device communicatively coupled to the access point;
transmit, from the low-power network device, a second message associated with requesting the power save mechanism; and
in response to transmitting the second message associated with requesting the power save mechanism, cause the first network device to:
determine a sleep duration associated with a sleep mode of the low-power network device;

disable a network connection with the access point during the sleep duration associated with the sleep mode; and
after the sleep duration for the sleep mode:
enable the network connection with the access point,
receive a traffic indication map (TIM) message from the first network device, wherein the TIM message includes a delivery traffic indication message (DTIM) bit to indicate that the first network device has buffered packets destined for the low-power network device that were redirected by the access point to the first network device in accordance with the power save mechanism, and
receive the packets from the first network device.

31. The low-power network device of claim 30, wherein the instructions, when executed by the processor, cause the low-power network device to determine a sleep schedule, wherein the sleep schedule indicates repeating time intervals for which the low-power network device is in the sleep mode for the sleep duration.

32. The low-power network device of claim 30, wherein the instructions, when executed by the processor, cause the low-power network device to:
send a power save requirement from the low-power network device to the first network device;
receive available storage capacity information from the first network device; and
determine the sleep duration based, at least in part, on the available storage capacity information and the power save requirement.

33. The low-power network device of claim 30, wherein the instructions, when executed by the processor, cause the low-power network device to:
determine whether an internet protocol (IP) connection to the access point is active in response to enabling the network connection; and
re-establish the IP connection to the access point in response to a determination that the IP connection to the access point is not active.

34. The low-power network device of claim 30, wherein the instructions, when executed by the processor, cause the low-power network device to send a gratuitous address resolution protocol (ARP) message to the access point to direct subsequent packets to the low-power network device in response to a determination that the low-power network device is not in the sleep mode.

35. A non-transitory machine-readable medium having stored therein instructions which, when executed by a processor of a first network device, cause the first network device to perform operations that comprise:
transmitting, from the first network device to a low-power network device via an access point of a communication network, a first message indicating that the first network device supports a power save mechanism for the low-power network device communicatively coupled to the access point;
receiving, from the low-power network device, a second message associated with requesting the power save mechanism; and
in response to receiving the second message associated with requesting the power save mechanism:
determining a sleep duration associated with a sleep mode of the low-power network device;
causing packets destined for the low-power network device to be redirected to the first network device by the access point for at least part of the sleep duration;

buffering the packets at the first network device while the low-power network device is in the sleep mode;

sending a traffic indication map (TIM) message from the first network device to the low-power network device, wherein the TIM message includes a delivery traffic indication message (DTIM) bit to indicate the packets have been buffered; and providing packets, which have been buffered at the first network device during the sleep duration, from the first network device to the low-power network device via the access point.

36. A non-transitory machine-readable medium having stored therein instructions which, when executed by a processor of a low-power network device, cause the low-power network device to perform operations that comprise:

receiving, from a first network device, a first message via an access point of a communication network, the first message indicating that the first network device supports a power save mechanism for the low-power network device communicatively coupled to the access point;

transmitting, from the low-power network device, a second message associated with requesting the power save mechanism; and in response to receiving the second message associated with requesting the power save mechanism:
determining a sleep duration associated with a sleep mode of the low-power network device;
disabling a network connection with the access point during the sleep duration associated with the sleep mode; and
after the sleep duration associated with the sleep mode:
enabling the network connection with the access point,
receiving a traffic indication map (TIM) message from the first network device, wherein the TIM message includes a delivery traffic indication message (DTIM) bit to indicate that the first network device has buffered packets destined for the low-power network device that were redirected by the access point to the first network device in accordance with the power save mechanism; and
receiving the packets from the first network device.

37. The method of claim 12, wherein the notification to the low-power network device comprises an indicator in a traffic indication map.

38. The method of claim 23, wherein the notification comprises an indicator in a traffic indication map.

* * * * *